United States Patent [19]

Doornhein et al.

[11] Patent Number: 5,196,736
[45] Date of Patent: Mar. 23, 1993

[54] SIGNAL TRANSIENT IMPROVEMENT DEVICE HAVING A DELAY CIRCUIT IN WHICH THE AMOUNT OF DELAY IS ADJUSTABLE

[75] Inventors: Laurens Doornhein; Jeroen Kettenis, both of Eindhoven, Netherlands

[73] Assignee: U.S. Philips Corporation, New York, N.Y.

[21] Appl. No.: 749,791

[22] Filed: Aug. 26, 1991

[30] Foreign Application Priority Data

Sep. 27, 1990 [EP] European Pat. Off. ........ 90202551.9

[51] Int. Cl.$^5$ ...................... H03K 5/159; H03K 3/01; H04N 9/64; H04N 5/14
[52] U.S. Cl. .................................... 307/263; 307/268; 307/602; 307/603; 307/595; 307/597; 328/55; 328/66; 358/37; 358/166
[58] Field of Search ............... 307/595, 597, 602, 603, 307/605, 606, 241, 243; 328/55, 61, 66; 358/37, 166

[56] References Cited

U.S. PATENT DOCUMENTS

| | | | |
|---|---|---|---|
| 3,752,916 | 8/1973 | Lowry et al. | 178/73 R |
| 4,030,121 | 6/1977 | Faroudja | 358/37 |
| 4,223,342 | 9/1980 | Tsuchiya et al. | 358/37 |
| 4,758,891 | 7/1988 | Hitchcock et al. | 358/166 |
| 4,777,385 | 10/1988 | Hartmeier | 307/263 |

FOREIGN PATENT DOCUMENTS

| | | |
|---|---|---|
| 2854893 | 2/1989 | Fed. Rep. of Germany . |
| 1-300791 | 12/1989 | Japan . |
| 2144302 | 2/1985 | United Kingdom . |

*Primary Examiner*—William L. Sikes
*Assistant Examiner*—Trong Quang Phan
*Attorney, Agent, or Firm*—Edward W. Goodman

[57] ABSTRACT

A signal transient improvement device includes a delay circuit (1-13) receiving an input signal (C) and having an output supplying an output signal which is a version of the input signal either delayed by a predetermined amount (T3), or delayed by a controllable amount less than or equal to the predetermined amount, and a control circuit (15-23) for controlling the delay circuit. The control circuit calculates the second derivative of the input signal to obtain a control signal, the sign of which indicates whether the input signal is to be delayed by the predetermined amount, or delayed by a controllable amount less than or greater than the predetermined amount, while the amplitude of the control signal indicates the magnitude of the controllable amount less than or greater than the predetermined amount by which the input signal is to be delayed.

12 Claims, 3 Drawing Sheets

SIGNAL TRANSIENT IMPROVEMENT DEVICE HAVING A DELAY CIRCUIT IN WHICH THE AMOUNT OF DELAY IS ADJUSTABLE

BACKGROUND OF THE INVENTION

Field of the Invention

The invention relates to a signal transient improvement device having an input for receiving an input signal with smooth transitions and an output for supplying an output signal with sharpened transitions.

Description of the Related Art

Such a signal transient improvement device is disclosed in U.S. Pat. No. 4,777,385. The control means of the prior art device include a transition detector which provides an output signal upon the detection of a signal transition having a slope of magnitude greater than a predetermined value. The transition detector output signal triggers a counter to count from 0 to 8 at a predetermined rate imposed by a given clock signal. The delay means include 8 cascade connected delay stages, and a multiplexer which, controlled by the counter, successively couples a central tap, outputs of the last four delay stages and inputs of the first four delay stages to the output of the signal transient improvement device.

The use of a transition detector causes the following problems. Upon the occurrence of noise, the transition detector may detect a transition where there is none. If the transition is only small, it may be detected later or not at all; it is to be noted that if in successive lines of the picture a transition is sometimes detected and other times not detected, visible Artifacts will occur because sharpened and smooth transitions will be displayed below each other. If the signal transient improvement device is a digital device, a transition can only be detected upon a clock pulse. This may cause an annoying jitter if the detection is not on the same clock pulse in successive picture lines.

Moreover, as the transient detector output signal only triggers the counter to count, while the remainder of the enhancement is independent of the transition, the problem arises that the enhanced transition will occur midway between the original transition only for transitions having a given amplitude and duration.

U.S. Pat. No. 4,758,891 (PHA 40,499) describes a method and apparatus for improving the rise and fall time of a video signal in which the edges of an incoming video signal are sharpened by switching the output furnishing the sharpened signal in sequence first to receive a signal delayed by a given fixed amount, i.e. a signal which has not yet undergone a transition, and, secondly, to receive a signal advanced by a given fixed amount, i.e. one that has already completed the transition. The switching sequence is controlled by a control signal which is the sign of the product of the first and second derivatives of the incoming video signal. If the apparatus is a digital device, the sign function control signal can only change its value upon a clock pulse. As the sharpened signal can only be an undelayed video signal, a video signal delayed by the given fixed amount or a video signal advanced by the given fixed amount, disturbing jitter effects may be caused by the time-discreetness of the control signal of this apparatus if the change in the value of the sign function is not on the same clock pulse in successive picture lines.

SUMMARY OF THE INVENTION

It is, inter alia, an object of the invention to provide a signal transient improvement device which mitigates at least some of the above-mentioned problems.

For this purpose, the invention provides a signal transient improvement device having an input for receiving an input signal with smooth transitions and an output for supplying an output signal with sharpened transitions, comprising:

delay means having an input coupled to said device input, a control signal input, and an output for furnishing versions of said input signal to said device output which are delayed by a predetermined amount, delayed by a controllable amount less than said predetermined amount, or delayed by a controllable amount greater than said predetermined amount; and control means having a control signal output for applying a control signal to said control signal input, and including differentiating means coupled to receive a signal informing about said input signal for obtaining a second derivative of said informing signal, an output of said differentiating means being coupled to said control signal output, a sign of said control signal controlling whether said input signal is to be delayed by said predetermined amount by said delay means, or whether said input signal is to be delayed by a controllable amount less than or greater than said predetermined amount by said delay means, while an amplitude of said control signal controls the magnitude of the controllable amount less than or greater than said predetermined amount by which said input signal is to be delayed by said delay means.

The informing signal may be the signal to be processed itself, but also, for example, the luminance signal in case the signal to be processed is a chrominance signal. As yet another alternative the informing signal could be a combination of both chrominance signals (and the luminance signal).

The invention employs the fact that the second derivative of the input signal (or a related signal) always has a zero-crossing in the middle of the transition, also if this zero-crossing does not coincide with a sample position. The second derivative is therefore more able to give an exact indication of the position of the transition than the transition detector described in U.S. Pat. No. 4,777,385.

Compared to the apparatus described in U.S. Pat. No. 4,758,891, also the amplitude/sign combination control signal of the present invention can only change its value upon a clock pulse if the signal transient improvement device is implemented as a digital device. However, because the amount by which the input video signal has been delayed less than or greater than the predetermined amount by the circuit of the present invention can assume, in principle, as many values as the amplitude of the control signal of the present invention can assume, disturbing jitter effects caused by the time-discreetness of the control signal are virtually absent in the circuit of the present invention.

According to a preferred embodiment of the invention, said control means further include a series arrangement of an amplifier and a limiter arranged between said output of said differentiating means and said control signal output. Due to the amplifier, small transitions can also be correctly processed while the limiter ensures that the control signal does not become larger than corresponding to half the maximum transition period of the input signal. In, for example, the PAL television transmission system, this maximum transition period amounts to about 800 ns. In a multi-standard receiver, the limiter will preferably be designed to depend on the standard.

According to another way of ensuring that the control means are independent of the magnitude of the transitions, said control means further include a divider having a dividend input coupled to said output of said second differential means, a divisor input coupled to receive a first derivative of said informing signal, and an output coupled to said control signal output. Due to the division, the magnitude of the transition is divided out.

In a preferred embodiment, the delay means comprise a delay line having a plurality of taps, first and second multiplexers each selectively coupling one of the taps to respective multiplexer outputs, and an interpolator coupled to said multiplexer outputs and having an output coupled to said device output. Due to the use of two multiplexers which may select adjacent taps of the delay line, and the use of the interpolator interpolating between the multiplexer output signals, the delay caused by the delay means is no longer dependent on the sampling frequency in a digital embodiment, and/or on the number of taps of the delay line, so that the advantages offered by the calculation of the second derivative can be utilized in full.

It goes without saying that the invention can be implemented using digital techniques as well as analog techniques.

These and other (more detailed) aspects of the invention will be described and elucidated with reference to the drawings and examples.

DESCRIPTION OF THE PREFERRED EMBODIMENT

Figure 1A:
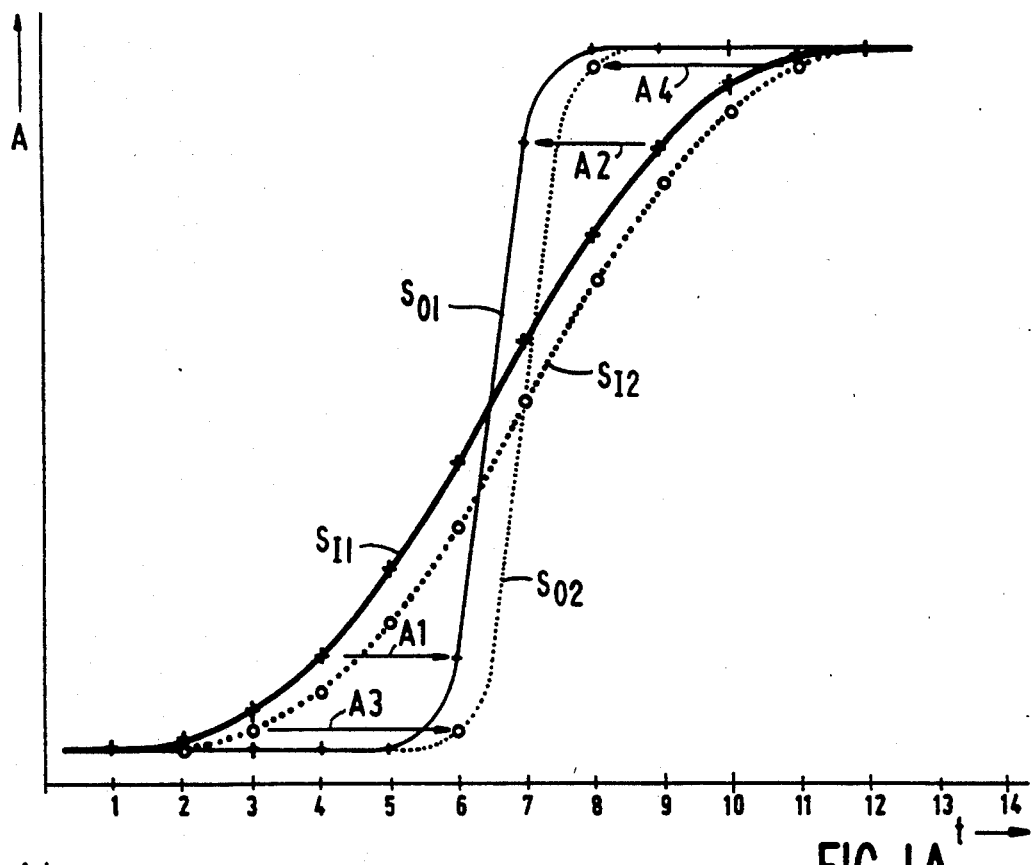
FIGS. 1A–1C show curves useful in explaining the present invention.
Figure 1B:
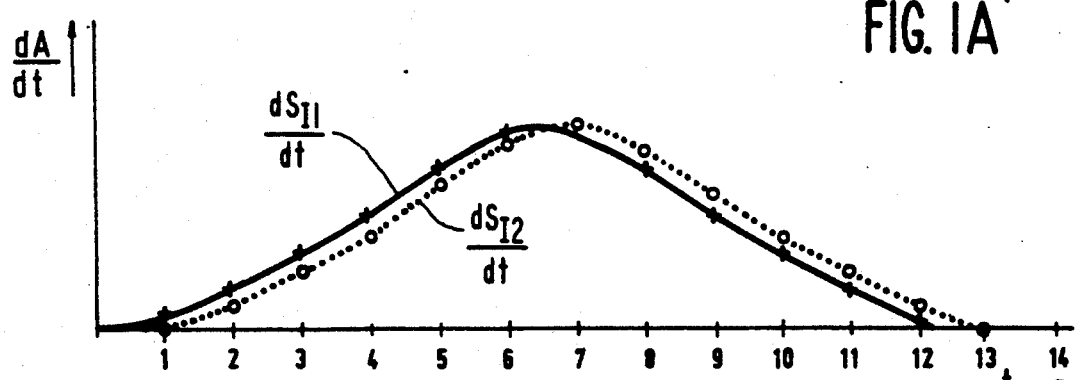

FIGS. 1A–7C show curves useful in explaining the present invention. In FIG. 1A, two input signals are shown, drawn in heavy lines, one solid $S_{i1}$, the other dotted $S_{i2}$, which are mutually shifted by one half of the sampling distance. The corresponding sharpened output signals $S_{o1}$ and $S_{o2}$ are drawn with lighter lines. In FIG. 1B first derivatives, while in FIG. 1C second derivatives corresponding to the input signals $s_{i1}$ and $S_{i2}$ shown. It is to be noted that while FIGS. 1A–1C show curves, in sampled systems values will only be available at the sampling instants indicated on the horizontal axis. In a preferred embodiment, the signals are sampled.

Figure 2:
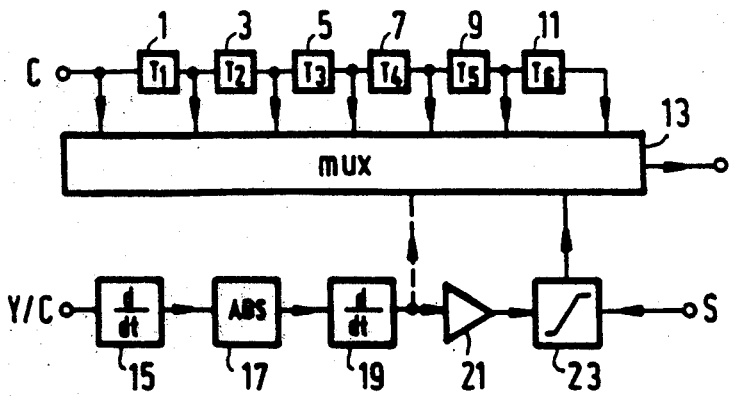
FIG. 2 shows a first embodiment of a signal transient improvement device according to the invention.

FIG. 2 shows a simple embodiment of a signal transient improvement device according to the invention for use as a color transient improvement (CTI) device. A color signal C is applied to a cascade arrangement of delay cells 1, 3, 5, 7, 9, 11. Outputs signals of each of these delay cells and the input signal C itself are applied to inputs of a multiplexer 13. The input signal C, or some other signal which can provide information about the transitions in the color signal C, as, for example, a combination of both chrominance signals and/or the luminance signal, is applied to a control circuit including a cascade arrangement of a first differentiator 15, an absolute value determinator 17, and a second differentiator 19. If desired, the output signal of the second differentiator 19 can be directly used as a control signal for the multiplexer 13, as indicated by a broken line. However, in order to provide a better control of the circuit, a preferred embodiment of the invention includes an amplifier 21 and a limiter 23 between the output of the second differentiator 19 and the control input of the multiplexer 13. The limiter 23 ensures that the control signal does not become larger than corresponding to half of the maximum transition period of the input signal. In, for example, the PAL television transmission system, this maximum transition period amounts to about 800 ns. As this period may be different in other transmission systems, a system information signal S is preferably applied to the limiter 23 to adapt the limiter to the kind of signal received by the television set incorporating the CTI device.

Figure 3:
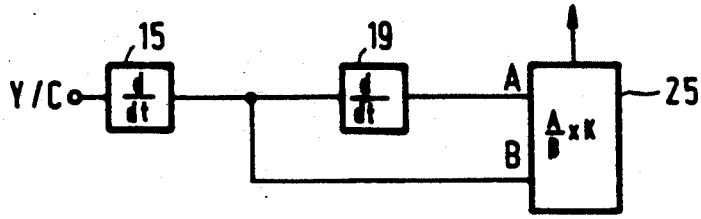
FIG. 3 shows another implementation of a control circuit for use in a signal transient improvement device according to the invention.

FIG. 3 shows another implementation of a control circuit for use in a signal transient improvement device according to the invention. In this implementation, the output of the first differentiator 15 is directly coupled to the input of the second differentiator 19 and to a divisor input (B) of a divider 25, while the output of the second differentiator 19 is coupled to a dividend input (A) of the divider 25. The divider 25 may additionally perform the functions of the amplifier 21 and the limiter 23 shown in FIG. 2. An output of the divider 25 is coupled to the control input of the multiplexer 13. Due to the division, the magnitude of the transition is divided out, so that small transitions are not placed at a disadvantage.

Figure 4:
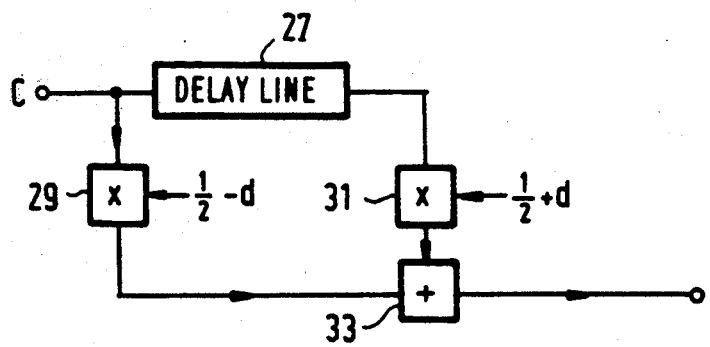
FIG. 4 shows another implementation of a delay circuit for use in a signal transient improvement device according to the invention.

FIG. 4 shows another implementation of a delay circuit for use in a signal transient improvement device according to the invention. The input signal C is now applied to a delay line 27. The input signal of the delay line 27 is multiplied by a factor of $(\frac{1}{2}-d)$ in a multiplier 29, and thereafter applied to an adder 33. The output signal of the delay line 27 is multiplied by a factor of $(\frac{1}{2}+d)$ in a multiplier 31, and thereafter also applied to the adder 33, which supplies the output signal of the signal transient improvement device. The value of d lies between $-\frac{1}{2}$ and $+\frac{1}{2}$, and is supplied by the control circuit, i.e. by limiter 23 of FIG. 2 or by divider 25 of FIG. 3.

Figure 5:
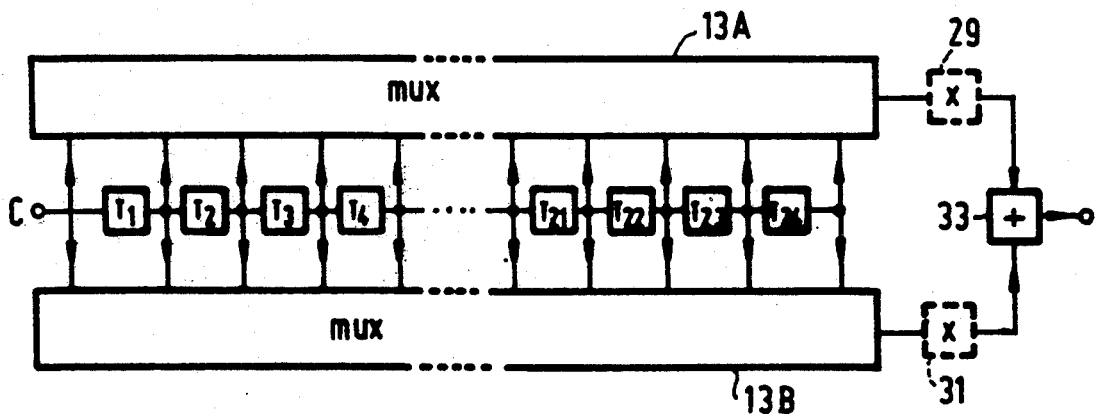
FIG. 5 shows a preferred embodiment of a signal transient improvement device according to the invention.
Figure 5:
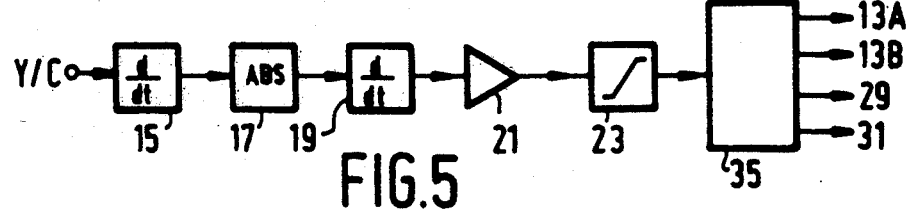

FIG. 5 shows a preferred embodiment of a signal transient improvement device according to the present invention. Here, the delay circuit comprises 24 delay cells T1, T2, T3, T4, ... T21, T22, T23, and T24 connected in cascade, and two multiplexers 13A, 13B each selecting a tap of the delay line T1 ... T24. An interpolator, which in a simple implementation consists of the adder 33, averages the output signals of the multiplexers 13A and 13B, the interpolation result forming the output signal of the signal transient improvement device. When both multiplexers 13A, 13B select the same tap, the same result is obtained as in an embodiment having only one multiplexer as shown in FIG. 2. However, when multiplexers 13A, 13B select adjacent taps, the average of the signals at these taps is outputted by the adder 33. Therefore, values between two sampling points can be accessed also. An even larger refinement can be obtained if the output signals of the multiplexers 13A, 13B are not just added and divided by two, but a weighted average is obtained by a more complex implementation of the interpolator which then also comprises the two multipliers 29 and 31. The multiplexers 13A, 13B and, if used, the multipliers 29, 31 are controlled by a control unit 35 having a first output applying the second derivative rounded down to the multiplexer 13A, a second output applying the second derivative rounded up to the multiplexer 13B, a third output applying one minus the fractional portion of the second derivative to the multiplier 29, and a fourth output applying the fractional portion of the second derivative to the multiplier 31. The expressions "rounded up" and "rounded down" disregard the sign of the second derivative, i.e. $-2.5$ rounded down is $-2$ and rounded up yields $-3$. The control unit 35 receives the second derivative from the limiter 23. In this case, adder 33 simply sums the output signals of multipliers 29, 31.

Turning back to FIG. 1C, it will be shown how the sign and amplitude of the second derivative can be used to determine whether the signal is to be delayed by the predetermined amount, or delayed by a controllable amount less than or greater than the predetermined amount, and the magnitude of the controllable amount less than or greater than the predetermined amount by which the signal is to be delayed.

Figure 1C:
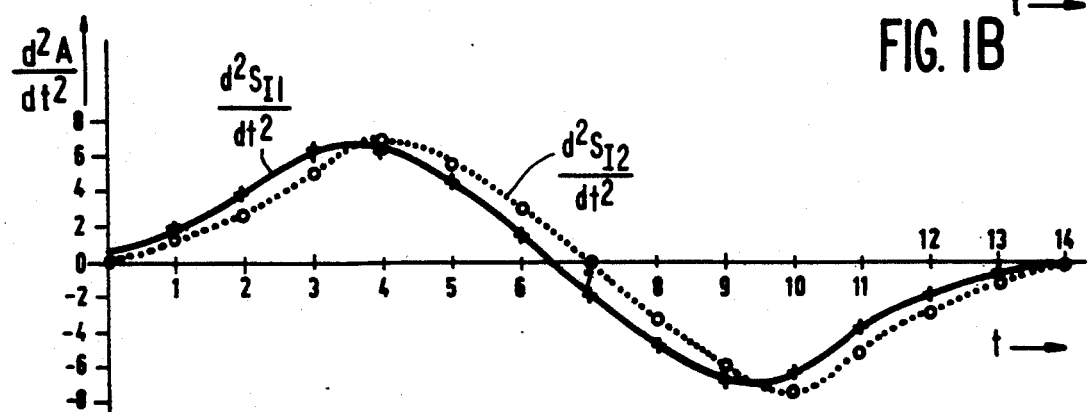

In FIG. 1C, the amplitude and sign of the second derivative indicate which tap position, calculated from the central tap indicated by a zero, should be coupled to the output. A positive value of the second derivative indicates the number of a tap position at the right hand side of the central tap, which gives a value delayed greater than the predetermined amount, and a negative value of the second derivative indicates the number of a tap position at the left hand side of the central tap, which gives a value delayed less than the predetermined amount. If the solid input curve $S_{I1}$ is followed, at $t=1$, the second derivative is $+2$, thus a value 2 instants earlier should be taken. At $t=2$, the second derivative is $+4$, thus a value 4 instants earlier should be taken. At $t=5$, the second derivative is $+5$, thus a value 5 instants earlier should be taken. At $t=6$, the second derivative is $+2$, thus a value 2 instants earlier should be taken (see arrow A1 in FIG. 1A). At $t=7$, the second derivative is $-2$, thus a value 2 instants later should be taken (see arrow A2 in FIG. 1A). At $t=8$, the second derivative is $-5$, thus a value 5 instants later should be taken. It is to be noted that at $t=6.5$, which is no sampling instant, the second derivative shows a zero crossing indicating the middle of the transition in the input signal. Due to the invention, the sharpened output signal crosses the smooth input signal exactly at this time.

If the dotted input curve $S_{I2}$ is followed, which is one half sampling instant delayed with respect to the other input signal, at $t=6$, the second derivative is $+3$, thus a value 3 instants earlier should be taken (see arrow A3 in FIG. 1A). At $t=7$, the second derivative has its zero crossing: the output signal should be equal to the input signal. At $t=8$, the second derivative is $-3$, thus a value 3 instants later should be taken (see arrow A4 in FIG. 1A). Due to the invention, a one half sampling instant delay in the input signal causes exactly one half sampling instant delay in the output signal, so that jitter effects caused by the time-discreteness of the control signal are virtually absent. If the signal shown in FIG. 1C is supplied by the second differentiator 19, a suitable amplification factor for amplifier 21 would be 1.5, which yields a maximum positive value of 12 and a maximum negative value of 12 which correspond to a maximum delay greater than the predetermined amount of 12 tap positions and a minimum delay less than the predetermined amount of 12 tap positions, respectively, of the delay circuit.

It is to be noted that the amplification factor of amplifier 21 is not a number without dimension (as usual), but defined as the number of sampling periods time shift over the number of least significant bit (LSB) steps. If the clock frequency of a digital system is 13.5 MHz, each sampling period is 74 ns. As the maximum transition period in a PAL television transmission system amounts to about 800 ns, the maximum time-shift desired amounts to about $\pm 400$ ns, so that about 6 LSB steps of 74 ns will be sufficient to cover the whole range of time-shifts. If these 6 LSB steps are compared to the maximum amplitude of the curves shown in FIG. 1C, it can be seen that an amplification factor of 1 is sufficient, while the limiter 23 has to cut off those parts of the curves which show an amplitude above 6. In a practical embodiment, the amplification factor can be selected from the values 0.25, 0.50, 1 and 2. In the last-mentioned case, the limiter 23 will be active during those parts of the curves shown in FIG. 1C which have an amplitude above 3.

Further in FIG. 1C, if the amplification factor is 2 and at $t=2$ the second derivative is $+4$ a value of $2\times 4=8$ limited to 6 instants earlier should be taken to obtain the corresponding value of the sharpened output signal, and so on.

Figure 6:
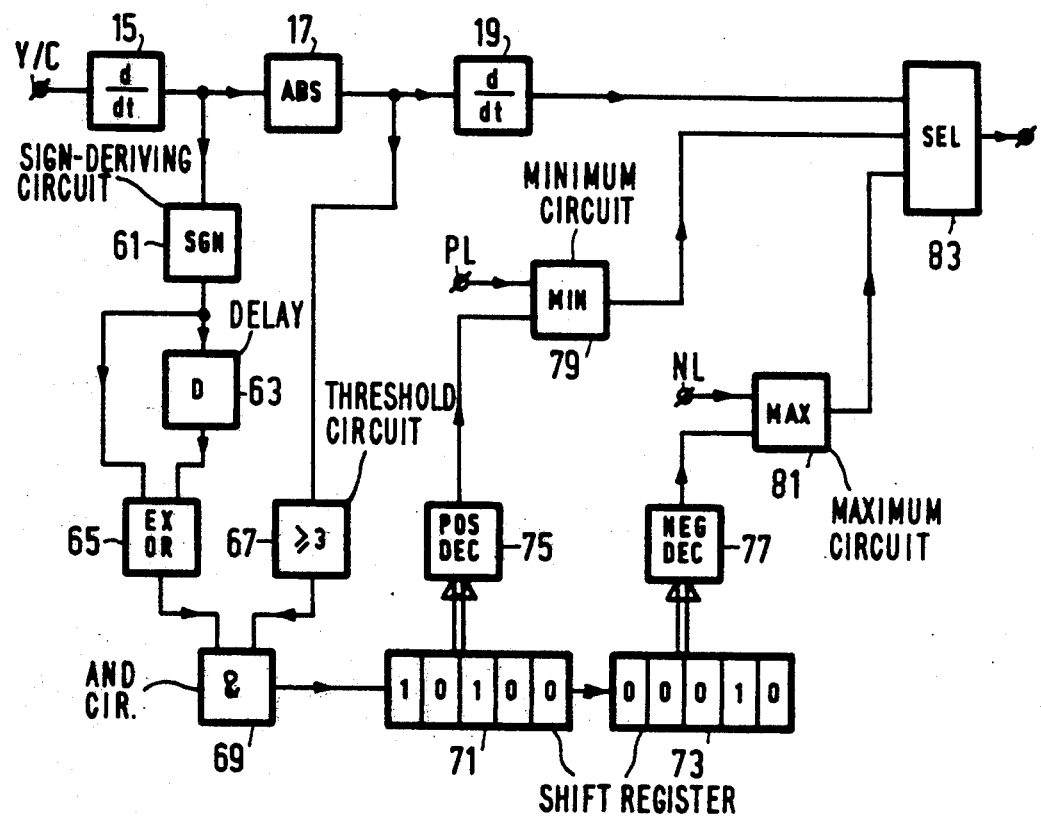
FIG. 6 shows a control circuit having a correction circuit to improve the operation of the signal transient improvement device according to the invention.

FIG. 6 shows a control circuit provided with a correction circuit to improve the operation of the signal transient improvement device according to the invention. It has been found that when a first transient in a given direction is closely followed by a second transient in the opposite direction, errors may occur because the second derivative used to sharpen one of these transients may indicate that a value beyond the other transient should be taken. Therefore, it has been found desirable to dynamically limit the second derivative signal to the distance between the present position and the position where the second transient succeeds the first transient. It has been found that this latter position is indicated by a zero-crossing in the first derivative signal furnished by the first differentiator 15. To determine the position of this zero-crossing, a sign-deriving circuit 61 is connected to the output of the first differentiator 15. The output of the sign-deriving circuit (SGN) 61 is applied directly and through a delay device (D) 63 to respective inputs of an EXOR-circuit 65. The delay device 63 may provide, for example, a 2 clock pulse delay. The output of EXOR-circuit 65 will be logical 1 if its input signals stem from opposite sides of the zero-crossing in the first derivative signal, and thus indicate a transition between two oppositely directed transients. To reduce the influence of noise, the output of EXOR-circuit 65 is used only if the absolute value of the first derivative signal exceeds the value 3, i.e. when the zero-crossing is a real zero-crossing. To this end the output of absolute value determinator 17 is applied to a threshold circuit 67 whose output is only 1 if the absolute value exceeds 3. Of course, other thresholds may be used as well. The outputs of EXOR-circuit 65 and threshold circuit 67 are combined in AND-circuit 69 so as to eliminate noise influences.

The output of AND-circuit 69 is applied to a cascade connection of a left shift register 71 and a right shift register 73. To simplify the drawing, each shift register is shown to have only 5 sections. The delays effected by the various circuit elements of the correction circuit have been designed such that the distance between a "1" in a shift register and the boundary between the two shift registers 71,73 is equal to the distance between the transition between two transients and the present position. The operation of the correction circuit is such that a "1" in the left shift register 71 indicates a positive, i.e. upper limit to the second derivative signal, while a "1" in the right shift register 73 indicates a negative, i.e. lower limit to the second derivative signal. The contents of the left shift register 71 are interpreted by positive decoder 75, whose parallel inputs are coupled to parallel outputs of shift register 71, such that the contents shown in the drawing result in that the positive, upper limit to the second derivative signal is +3, the additional "1" at distance 5 from the boundary between the two shift registers 71,73 being ignored. The contents of the right shift register 73 are interpreted by negative decoder 77, whose parallel inputs are coupled to parallel outputs of shift register 73, such that the contents shown in the drawing result in that the negative, lower limit to the second derivative is −4.

The output of positive decoder 75 is applied, together with a preset positive limit PL which may depend upon the television transmission standard as set out above, to a minimum value determinator (MIN) 79 which selects the more limiting positive limit to the second derivative signal. The output of negative decoder 77 is applied, together with a preset negative limit NL which may depend upon the television transmission standard, to a maximum value determinator (MAX) 81 which selects the more limiting negative limit to the second derivative signal.

Finally, selector (SEL) 83 selects the second derivative signal if this signal is between the two limit values furnished by MIN-circuit 79 or MAX-circuit 81, selector 83 selects the output of MIN-circuit 79 if the second derivative signal exceeds its upper limit as furnished by MIN-circuit 79, and selector 83 selects the output of MAX-circuit 81 if the second derivative signal is smaller than its negative limit as furnished by MAX-circuit 81.

It goes without saying that shift-registers 71, 73 together may form one single shift register and that the functions of MAX-circuit 79, MIN-circuit 81 and SEL-circuit 83 may be carried out by another type of threshold circuit limiting by the smaller of two upper limits and the larger of two lower limits. It will be evident that those skilled in the art will be able to develop an abundance of other alternatives to the embodiments described above, so that the described embodiments should be considered as indicating the minimum scope of the invention rather than the maximum scope of the invention.

We claim:

1. Signal transient improvement device having an input for receiving an input signal with smooth transitions and an output for supplying an output signal with sharpened transitions, comprising:

delay means having an input coupled to said device input, a control signal input, and an output for furnishing said output signal to said device output, wherein, in response to a control signal applied to said control signal input, said output signal is a version of said input signal delayed by a predetermined amount, said output signal is a version of said input signal delayed by a controllable amount less than said predetermined amount, or said output signal is a version of said input signal delayed by a controllable amount greater than said predetermined amount; and control means having a control signal output for applying said control signal to said control signal input of said delay means, and including differentiating means coupled to receive a characteristic signal indicative of a characteristic of said input signal, for obtaining a second derivative of said characteristic signal, an output of said differentiating means being coupled to said control signal output, a sign of said control signal controlling whether said output signal is said version of said input signal which is delayed by a controllable amount less than or greater than said predetermined amount by said delay means, while an amplitude of said control signal controls whether said output signal is said version of said input signal which is delayed by said delay means by said predetermined amount, or said amplitude of said control signal controls a magnitude of the controllable amount by which said input signal is delayed by said delay means less than or greater than said predetermined amount.

2. Signal transient improvement device as claimed in claim 1, wherein said control means further include a series arrangement of an amplifier and a limiter arranged between said output of said differentiating means and said control signal output.

3. Signal transient improvement device as claimed in claim 2, wherein said delay means comprise a delay line, and a mixing circuit having a first and a second input coupled to an input and an output of said delay line, respectively, and a control input coupled to said control signal output.

4. Signal transient improvement device as claimed in claim 2, wherein said delay means comprise a delay line having a plurality of taps, first and second multiplexers each selectively coupling one of the taps to respective multiplexer outputs, and an interpolator coupled to said multiplexer outputs and having an output coupled to said device output.

5. Signal transient improvement device as claimed in claim 1, wherein said control means further include a divider having a dividend input coupled to said output of said second differential means, a divisor input coupled to receive a first derivative of said informing signal, and an output coupled to said control signal output.

6. Signal transient improvement device as claimed in claim 5, wherein said delay means comprise a delay line, and a mixing circuit having a first and a second input coupled to an input and an output of said delay line, respectively, and a control input coupled to said control signal output.

7. Signal transient improvement device as claimed in claim 5, wherein said delay means comprise a delay line having a plurality of taps, first and second multiplexers each selectively coupling one of the taps to respective multiplexer outputs, and an interpolator coupled to said multiplexer outputs and having an output coupled to said device output.

8. Signal transient improvement device as claimed in claim 1, wherein said delay means comprise a delay line, and a mixing circuit having a first and a second input coupled to an input and an output of said delay line, respectively, and a control input coupled to said control signal output.

9. Signal transient improvement device as claimed in claim 1, wherein said delay means comprise a delay line having a plurality of taps, first and second multiplexers each selectively coupling one of the taps to respective multiplexer outputs, and an interpolator coupled to said multiplexer outputs and having an output coupled to said device output.

10. Signal transient improvement device as claimed in claim 1, wherein said differentiating means include a cascade coupling of a first differentiator, an absolute value former, and a second differentiator supplying said second derivative of said characteristic signal.

11. Signal transient improvement device as claimed in claim 10, wherein said control means further includes a correction circuit for dynamically limiting an amplitude of said second derivative in dependence upon a first derivative of said characteristic signal, furnished by said first differentiator, crossing zero, to obtain said control signal.

12. Signal transient improvement device as claimed in claim 11, wherein said correction circuit includes
means coupled to said first differentiator for furnishing a zero-crossing signal in response to a zero-crossing in said first derivative;
shift-register means for serially receiving said zero-crossing signal;
decoding means coupled to parallel outputs of said shift register means for obtaining limit values; and
limiting means coupled to said second differentiator and said decoding means to limit said amplitude of said second derivative in dependence upon said limit values.

* * * * *